United States Patent [19]

Marks

[11] Patent Number: 5,715,563
[45] Date of Patent: Feb. 10, 1998

[54] WINDSHIELD WIPER BRACKET

[75] Inventor: Joel Steven Marks, Los Angeles, Calif.

[73] Assignee: Worktools, Inc., Chatsworth, Calif.

[21] Appl. No.: 743,640

[22] Filed: Nov. 4, 1996

[51] Int. Cl.[6] ................................................ B60S 1/40
[52] U.S. Cl. ...................... 15/250.32; 15/250.361; 403/331
[58] Field of Search ................ 15/250.32, 250.33, 15/250.43, 250.44, 250.31, 250.351, 250.361, 250.48; 403/331, 24

[56] References Cited

U.S. PATENT DOCUMENTS

| | | | |
|---|---|---|---|
| 3,849,829 | 11/1974 | Wubbe | 15/250.32 |
| 4,118,825 | 10/1978 | Hoebrechts et al. | 15/250.32 |
| 4,224,001 | 9/1980 | Arndt et al. | 15/250.32 |
| 4,324,019 | 4/1982 | Mohnach et al. | 15/250.32 |
| 4,608,728 | 9/1986 | Sumins et al. | 15/250.32 |
| 4,866,812 | 9/1989 | Arai | 15/250.32 |
| 4,951,343 | 8/1990 | Scorsiroli | 15/250.32 |
| 4,970,751 | 11/1990 | Fisher et al. | 15/250.32 |
| 5,084,933 | 2/1992 | Buechele | 15/250.32 |
| 5,092,014 | 3/1992 | Charng | 15/250.32 |
| 5,289,608 | 3/1994 | Kim | 15/250.32 |
| 5,332,328 | 7/1994 | Yang | 15/250.32 |
| 5,383,248 | 1/1995 | Ho | 15/250.32 |
| 5,392,487 | 2/1995 | Yang | 15/250.32 |

FOREIGN PATENT DOCUMENTS

| | | | |
|---|---|---|---|
| 692084 | 7/1965 | Italy | 15/250.33 |
| 2055560 | 3/1981 | United Kingdom | 15/250.32 |
| 2117631 | 10/1983 | United Kingdom | 15/250.32 |
| 2168243 | 6/1986 | United Kingdom | 15/250.32 |
| 2186021 | 8/1987 | United Kingdom | 15/250.32 |

Primary Examiner—Gary K. Graham
Attorney, Agent, or Firm—Paul Y. Feng; Fulwider Patton Lee & Utecht, LLP

[57] ABSTRACT

A windshield wiper adaptor system that fits hook, bayonet and small and large pin wiper arm styles is disclosed. A bracket semi-permanently snap fits to a spring steel flat strip wiper frame. Adaptors fit to the bracket. The bayonet arm adaptor uses an easily molded slot to provide the detent for holding the arm. A resilient element presses the bayonet arm from below. The hook/bayonet adaptor pin, and pin arm adaptors, are held in the bracket by a barbed resilient arm attached to the pins. A further extension on the resilient arm of the pin arm adaptors engages the pin arm annular groove. Deflecting the arm causes the barb to engage the bracket while the same motion engages the pin arm groove. The adaptors could also be used in a convention frame where the bracket is not applicable.

11 Claims, 4 Drawing Sheets

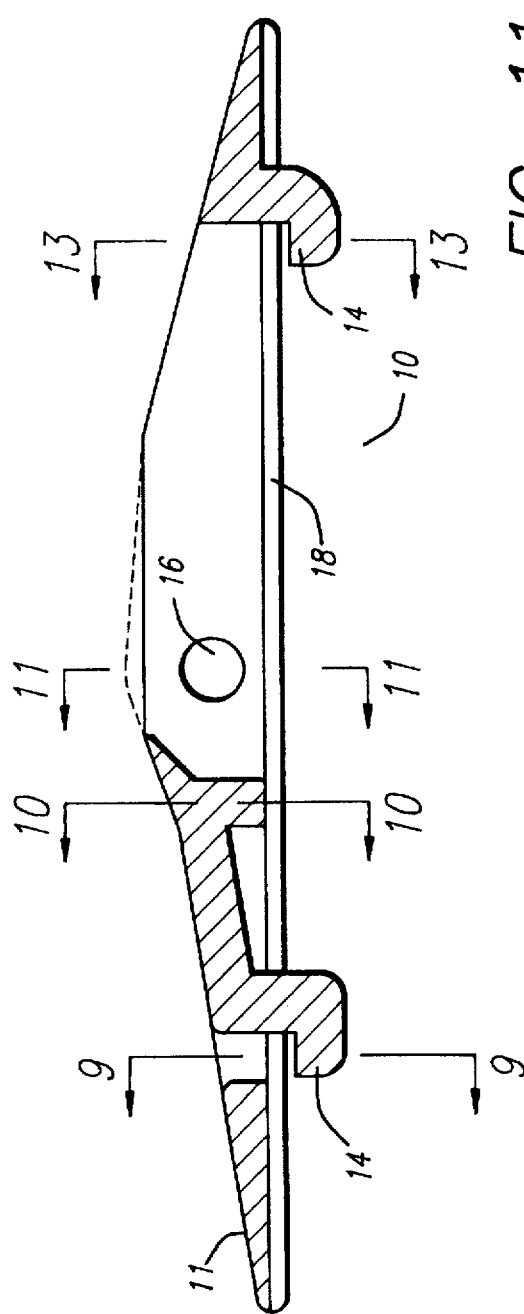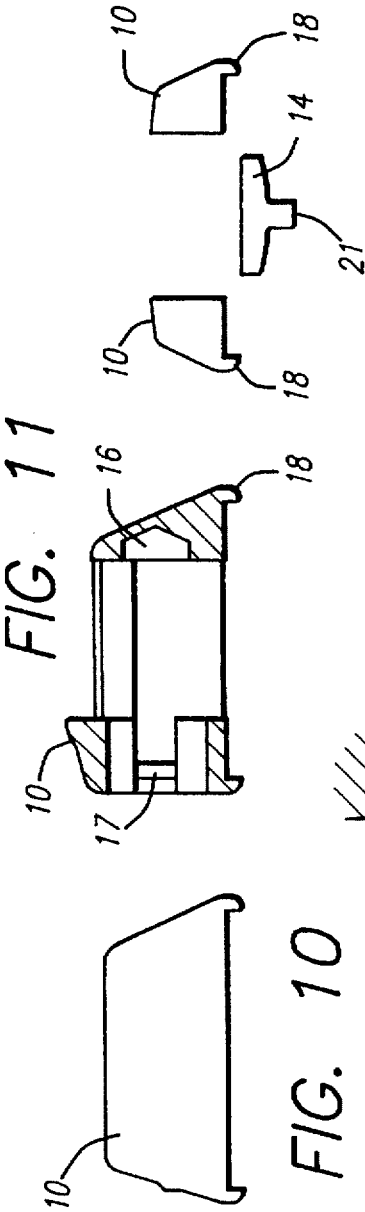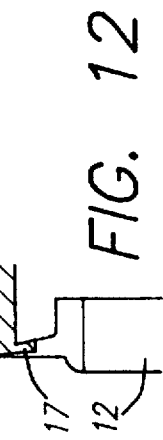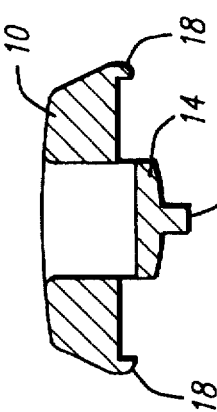

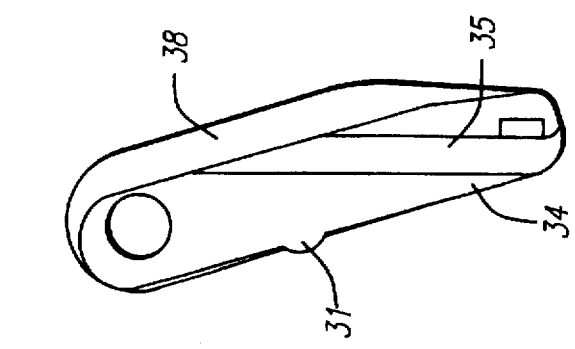
FIG. 17
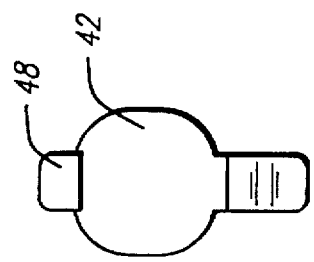
FIG. 20
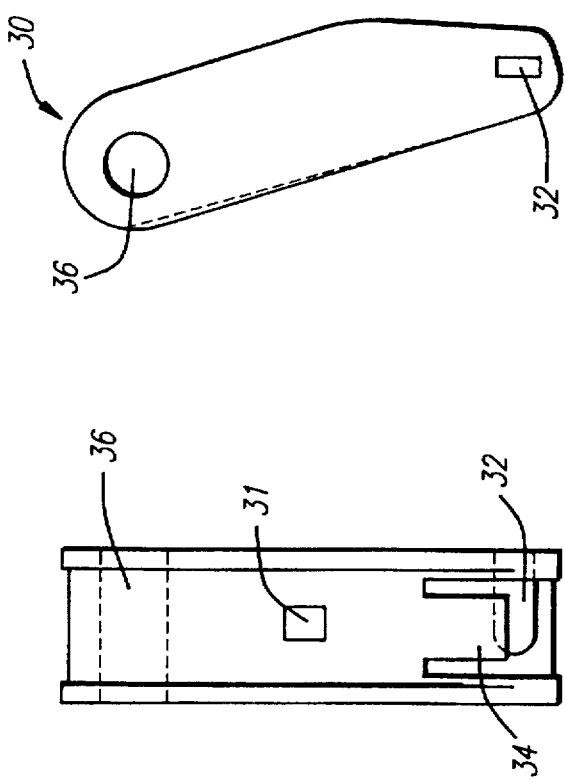
FIG. 16
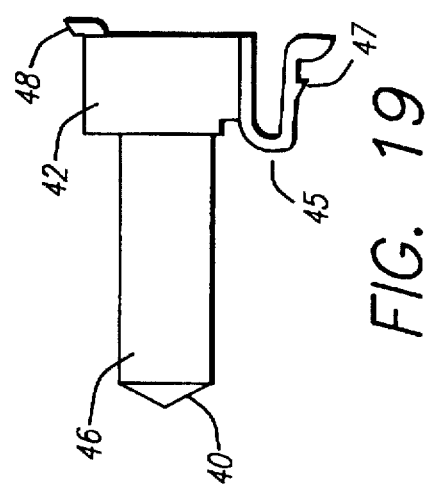
FIG. 19
FIG. 15
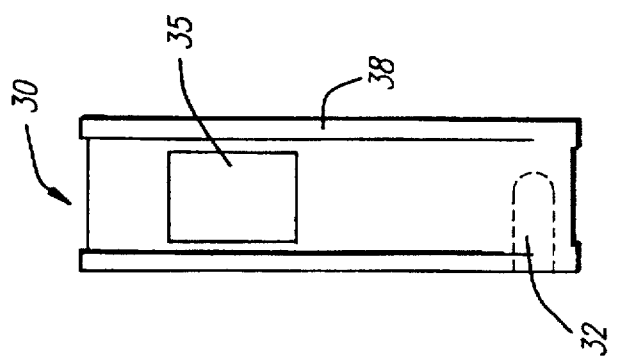
FIG. 14
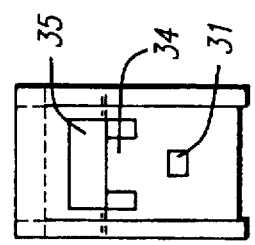
FIG. 18

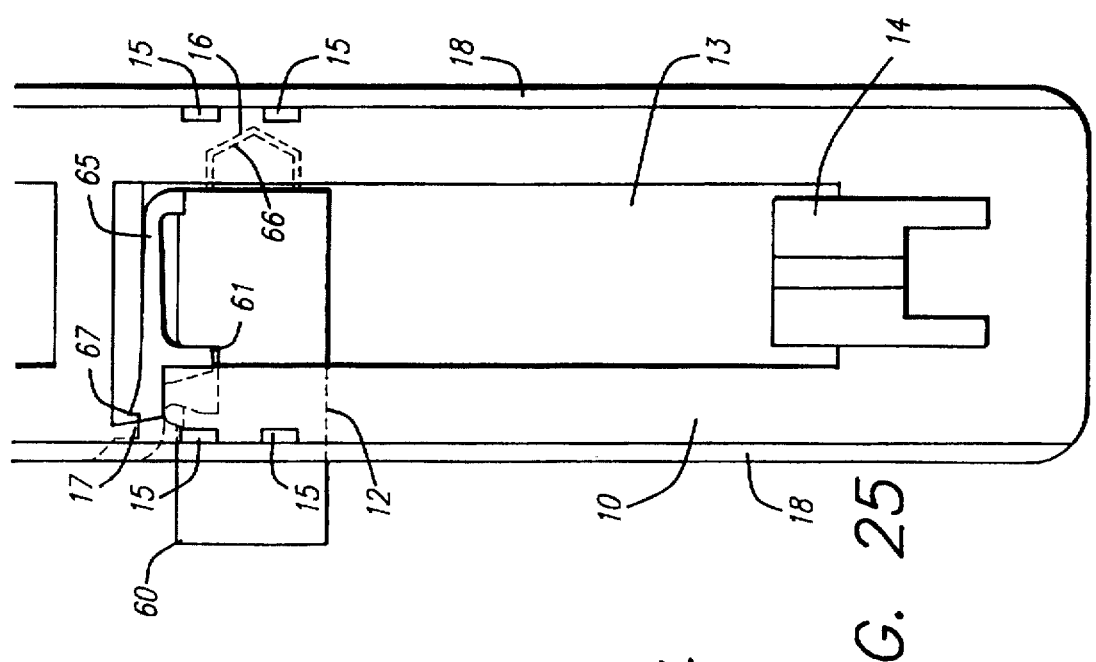
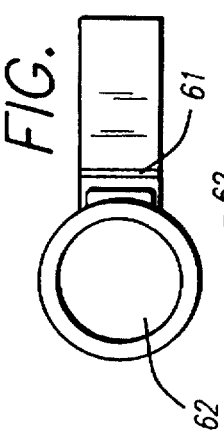
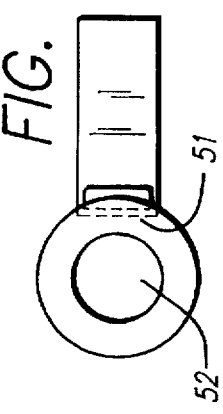
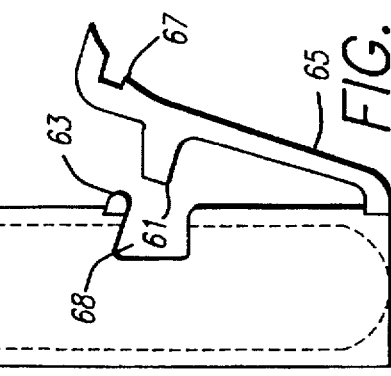
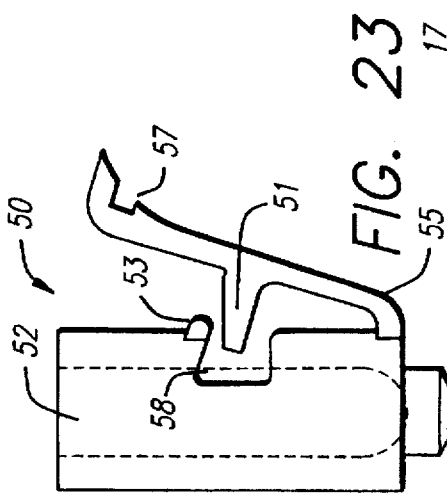
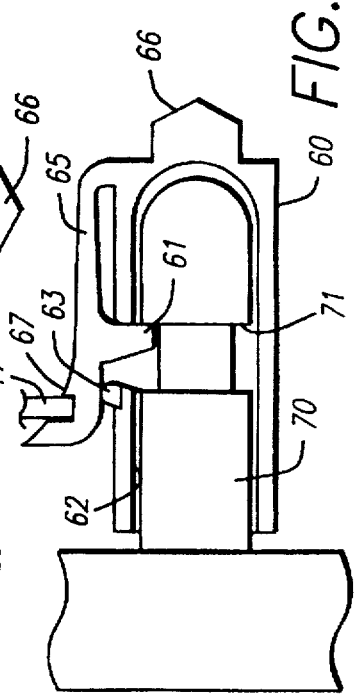

WINDSHIELD WIPER BRACKET

BACKGROUND OF THE INVENTION

1. Field of the Invention

The present invention relates to windshield wipers. More precisely, the present invention relates to a universal windshield wiper bracket.

2. Description of the Related Art

In typical windshield wipers, the squeegee or blade must be replaced after it is worn. In some instances, the entire blade assembly is replaced. Unfortunately, finding a less expensive, after market wiper blade or replacement blade assembly that matches the OEM windshield wiper arm of the vehicle is sometimes not an easy task.

Therefore, a need exists for a universal windshield wiper attaching system that fits currently popular formats and is compact and simple. A simple universal system has been needed especially because of the introduction of the large pin arm of 0.25 inch diameter. With the small pin arm, of 0.19 inch diameter, the bayonet, hook and pin arm could be accommodated. But an adaptor which fits in a standard hook arm cannot have a hole large enough to fit the new large pin arm. This is because the 0.25 inch diameter hole would span nearly the entire thickness of any hook arm adaptor, and the adaptor would itself be too large to fit within a standard hook. At least the large pin adaptor should then be a separate device from the hook adaptor.

In the present invention, no pin adaptor cavities are in the hook adaptor. The rectangular channel for the bayonet arm remains in the hook adaptor, but can now be made larger and sturdier, since the pin arm holes do not interfere.

The pin adaptors are separate components, one small and one large. All formats pivot about the same point in the present invention. In contrast, many prior art designs require the use of separately spaced pivot locations for different formats. The wiper arm thus applies force at an off center location for at least some formats in some of the prior art.

The present invention adaptors can provide a benefit to conventional windshield wiper frames. When combined with the bracket of the present invention, the attaching system is especially suited for a thin spring steel strip frame such as that disclosed in co-pending U.S. patent application Ser. No. 08/331,705, filed Oct. 31, 1994 by the present inventor. The bracket provides an easily manufactured three dimensional structure atop the two dimensional steel frame for mounting various adaptors. The bracket is semi-permanently mounted to the frame in a snap fit. It is optimized to have a low profile so as not to visually disrupt the smooth top surface of the flat spring steel frame. The low profile that is a subject of application Ser. No. 08/331,705 is well served by the compact bracket of the present invention.

There have been developments in windshield wiper technology. For example, U.S. Pat. No. 4,866,812, issued to Arai, discloses a method of holding a pivot pin within a wiper frame. A hook arm adaptor is snap fitted over the pin. Other single purpose adaptors are shown.

U.S. Pat. No. 4,951,343, issued to Scorsirolli, teaches a connector for hook and bayonet wiper arms. A body pivots about a wiper frame pin, and an insert fits in the body to secure the arm by pressing up on the arm from the force of a screw. It is a tall structure.

U.S. Pat. No. 5,084,933, issued to Buechele, discloses an adapter to fit hook, bayonet, and pin type wiper arms. A hole in the frame fits one size of pin arm. A slot of the adaptor slides over the pin arm to secure it. Inward protrusions in the frame are spaced from the pin arm holes and are a pivot point for further slots that are used with the hook or bayonet arm. A resilient member on the top side of the bayonet arm channel has a hole to capture the circular protrusion of the arm. The adaptor is particularly tall.

U.S. Pat. No. 5,092,014 issued to Charng, discloses a pin arm adaptor integrated with a wiper arm. The device fits either small or large pin arm. A bushing provides the diameter reduction to fit the small pin arm. The latches to engage the pin annular grooves are attached on opposing sides of the adaptor body, the latches being of different lengths to fit the respective difference in the groove location between the small and large pin arm. A separate device would be needed to fit the hook and bayonet arm.

U.S. Pat. No. 5,289,608, issued to Kim, discloses an adaptor to fit hook, bayonet, and small pin arm. It functions similarly to Buechele, but it is more compact since the slots hold the various pins in the space inside the hook arm holding portion. A hole captures the top bump on the bayonet arm. There is no cantilevered element to bias the bayonet arm into place. The adaptor is not large enough to fit the large pin arm. It is a compact structure.

U.S. Pat. No. 5,332,328, issued to Yang, discloses an adaptor to fit hook, bayonet, and small and large pin arm. A slot to fit over a wiper frame pivot pin is below the main structure. The bayonet arm is attached by screws. Two differently sized holes fit the small and large pin arms. Two corresponding cantilevered arms above each hole are part of the wiper body and resiliently engage the respective pin arms.

U.S. Pat. No. 5,383,248, issued to Ho, discloses a two piece adaptor. An insert fits over a retaining pin in the wiper frame, but does not pivot about the pin. One size pin arm fits through a hole in the frame and engages the inner adaptor by a latching means similar to Charng. A second component fits over a hook arm to convert it to pin arm, which then similarly engages the inner adaptor. It is a bulky design.

U.S. Pat. No. 5,392,487, issues to Yang, discloses an adaptor to fit hook, bayonet, and small and large pin arm. One cantilevered upper leaf spring and two cantilevered lower leaf springs provide an engagement bias for the wiper arm fittings. The upper spring engages the circular bump atop the bayonet arm. The lower springs face each other and respectively engage the small and large pin arms. A bump upon the front lower spring engages the hook or divot in the hook arm. The device is tall.

SUMMARY OF THE INVENTION

The present invention in a preferred embodiment comprises a windshield wiper bracket and adaptor assembly especially suitable for attaching a wiper arm to a thin, substantially two dimensional wiper frame section. The adaptor elements may also provide an advantage when used within the thickness of a conventional metal or plastic frame.

The present invention bracket fits to the wiper frame by a sliding snap fit. Hook elements of the bracket slide under the sheet metal frame until separately located bumps on the bracket snap into notches on the frame. Preferably, the resilience of the sheet metal frame is what enables this snap.

The bracket provides a three dimensional structure to support various wiper arm adaptor fittings. The bracket preferably has a sloped or tapered contour atop the frame to give a smooth appearance and snag resistant surface.

In the present invention, four specific wiper arm formats or embodiments are addressed, although the bracket concept may support additional formats.

One adaptor embodiment rotatably fits in an elongated cavity of the bracket. The adaptor rotates about a snap fitted removable pin. The pin is installed through a hole in the side of the bracket. This adaptor fits a conventional windshield wiper hook arm and the currently less common bayonet arm. The hook arm is fitted in a well known way. The bayonet arm fits in an especially long channel of the adaptor. A standard bayonet arm includes a circular protrusion to engage a retaining recess. In the present invention adaptor, the recess is a slot descending from one side of the adaptor. The conventional circular recess in the top of the adaptor requires a more complex mold slide to produce. A cantilevered resilient element of the adaptor provides a spring bias to engage the circular protrusion into the notch.

The adaptor pin is held from falling out by a resilient arm cantilevered from and mostly parallel to the pin. The arm includes a small outward extension to engage a rib of the bracket. A small tab opposite the arm facilitates removing the pin.

Further adaptor embodiments include a large and a small pin arm. Either of these is used when required instead of the pin and hook arm embodiment described above. The pin arm adaptors are fitted through the hole in the side of the bracket. A cantilevered resilient arm extends along the length of the adaptor body, in an angled relationship to the body. A small extension similar to that described above holds the adaptor within the bracket.

A longer extension points toward the hollow interior of the adaptor to engage the concentric groove of a standard pin arm. Pressing the adaptor into the bracket hole forces the resilient arm toward the adaptor body. The inward facing extension engages the pin arm groove as the smaller outward extension snaps into position against the bracket rib.

The large pin arm is difficult to provide for in many conventional universal adaptor designs. On the other hand, the present invention adaptor fits the large pin arm within a simple and compact system.

The present invention hook and bayonet adaptor, in its preferred embodiment, is a stiff design because it has none of the large cavities that are needed to fit the pin arm. The absence of a pin arm cavity further allows the bayonet arm channel to extend much of the length of the adaptor.

Since the bracket sits atop the thin wiper frame, a straight bayonet arm can pass over the frame without interfering with the frame. The large side adaptor typically required for the straight arm is therefore not needed.

These and other aspects and advantages of the present invention will become apparent from the following detailed description and the accompanying drawings, which illustrate by way of example the features of the invention.

BRIEF DESCRIPTION OF THE DRAWINGS

FIG. 8 is a side elevational view of the bracket with partial sections.

FIG. 9 is a cross-sectional view of the bracket taken along line 9—9 of FIG. 8.

FIG. 10 is a cross-sectional view of the bracket taken along line 10—10 of FIG. 8.

FIG. 11 is a cross-sectional view of the bracket taken along line 11—11 of FIG. 8.

FIG. 12 is a magnified view of the keyhole shape hole and rib from FIG. 11.

FIG. 13 is a cross-sectional view of the bracket taken along line 13—13 of FIG. 8.

FIG. 14 is a top plan view of the hook/bayonet adaptor.

FIG. 15 is a bottom plan view of the hook/bayonet adaptor.

FIG. 16 is a side elevational view of the hook/bayonet adaptor.

FIG. 17 is the view of FIG. 16, in partial section.

FIG. 18 is an end elevational view of the hook/bayonet adaptor.

FIGS. 19–20 are a side elevational and a front end view, respectively, of a pin showing the flexible arm with a barb.

FIG. 21 is an end view of a small pin arm adaptor.

FIG. 22 is an end view of a large pin arm adaptor.

FIG. 23 is a side elevational view of the small pin arm adaptor from FIG. 21.

FIG. 24 is a side elevational view of the large pin arm adaptor from FIG. 22.

FIG. 25 is a partial bottom plan view showing assembly of the large pin arm adaptor to the hole inside the bracket.

FIG. 26 is a detailed view of FIG. 25 showing the assembly of a windshield wiper pin arm into the large pin arm adaptor and the bracket.

DETAILED DESCRIPTION OF THE PREFERRED EMBODIMENTS

The following specification describes a universal windshield wiper adaptor. In the description, specific materials and configurations are set forth in order to provide a more complete understanding of the present invention. But it is understood by those skilled in the art that the present invention can be practiced without those specific details. In some instances, well-known elements are described in detail so as not to obscure the invention.

Figure 1:
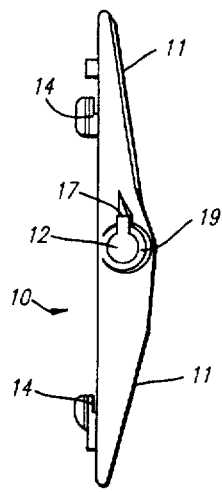
FIG. 1 is a side elevational view of a preferred embodiment of the present invention bracket adaptor.

FIGS. 1 though 12 show the preferred embodiment of bracket, 10. Bracket 10 attaches to windshield wiper frame segment 20. In the preferred embodiment, frame segment 20 is a slightly curved strip metal form, made of spring steel. Hooks 14 slide under ribs 24. Frame 20 curves in a convex fashion toward the flat underside of bracket 10. The curvature causes notches 25 to be biased toward bumps 15. As bracket 10 slides to a final position atop frame 20, notches 25 snap into place around bumps 15. The assembly is preferably done by the manufacturer rather than by the end user. The adaptors described hereinafter are preferably assembled by the end user.

Figure 2:
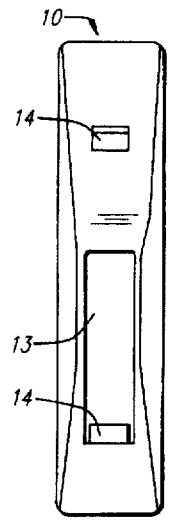
FIG. 2 is a top plan view of the bracket adaptor.
Figure 3:
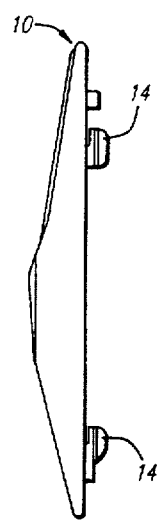
FIG. 3 is a side elevational view of the bracket showing the opposite side to that shown in FIG. 1.
Figure 4:
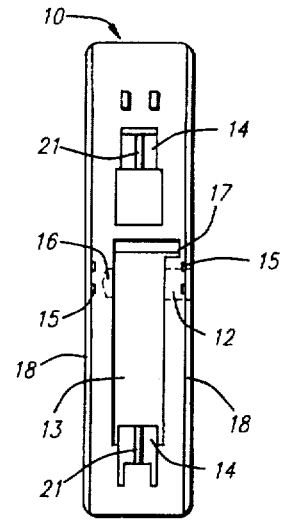
FIG. 4 is a bottom plan view of the bracket.
Figure 5:
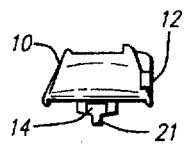
FIGS. 5–6 are end elevational views of the bracket.
Figure 6:
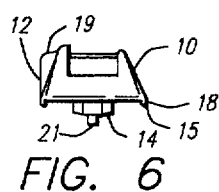
Figure 7:
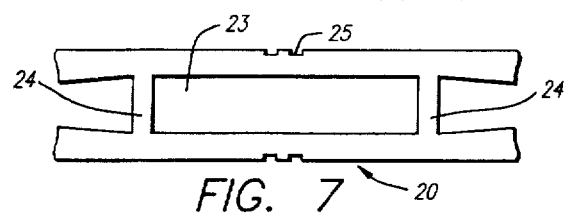
FIG. 7 is a plan view of a segment of a flat strip spring steel windshield wiper frame.

A descending stiffening rib 21 may be included as shown best in FIGS. 5 and 6 to reinforce hooks 14. An elongated cavity 13 is present above the forward hook 14, shown in FIGS. 2 and 4, to facilitate injection molding manufacturing of the bracket.

Elongated cavity 13 slidably fits hook/bayonet adaptor 30. A similar cavity 23 provides further clearance for adaptor 30 in frame 20.

Holes 12 and 16 receive one of pins 40, 50, or 60. Flange 19 reinforces keyhole shape hole 12 so that the height of the bracket can be minimized. Ribs 18 fit tightly around the width of frame 20. Rib 17 provides an edge to latch pin 40, 50, or 60 into place. The keyhole shape of hole 12 fits pins 40, 50 or 60 in only one orientation, as shown in FIG. 25. Arms 45, 55, or 65 enter the rectangular slot of hole 12.

Hook/bayonet adaptor 30, as seen in FIGS. 14–18, fits into cavity 13. Hole 36 is aligned with hole 12 so that pin 40 may be pushed in through holes 12, 36, and 16. As assembled, bump 31 faces toward the flat bottom of bracket 10, and through cavity 23. Pin end 46 fits into hole 16 and head 42 fits within hole 12. Adaptor 30 pivots within cavity 13 about pin 90. During assembly, arm 45 deflects to allow barb 47 to engage rib 17. To remove pin 40, and then adaptor 30, arm 45 is forced inward to clear rib 17 and pulled out of hole 12. Tab 48 assists in the pulling action. FIG. 25 shows a typical pin and bracket assembly. In this case, a barb 67 similar to barb engages 47 engages rib 17. The distal end of arm 45, 55, or 65 is exposed outside of rib 17, so that it may be accessed for the removal operation.

For a hook arm, adaptor 30 fits into the hook in a conventional way, with the hook arm fitting between ribs 38. Adaptor 30 is pressed into the hook until bump 31 engages the usual hole or divot that is in the material of the hook arm. Slight spreading of the metal of the hook portion of the hook arm helps give clearance for the passage of bump 31 into the hook. In the present invention, adaptor 30 is installed to the arm first, then the adaptor/arm assembly is installed into cavity 13 of bracket 10. Finally, pin 40 is installed.

For the bayonet arm, the arm is pressed into channel 35 until the usual circular bump upon the arm engages the recess formed by slot 32. Resilient tab 34 provides the snap action to engage the bump into slot 32. Slot 32 could functionally be a circular hole as viewed in FIGS. 14 or 15. But the slot improves the manufacturability of adaptor 30, because preferably both slot 32 and hole 36 can be formed by mold slides moving in the same direction. Resilient tab 34 includes a decreasing thickness toward its distal end. This shape provides an efficient flexing of tab 34 since the bending stress similarly decreases toward the distal end. Channel 35 runs much of the length of adaptor 30, giving secure support around the bayonet arm. The bayonet arm/adaptor assembly is installed into bracket 30 in the same manner as the hook arm.

Small pin arm adaptor 50, shown in FIGS. 21, 23, and large pin arm adaptor 60, shown in FIGS. 22, 24–26, function similarly to each other, as described below. The description of FIGS. 22, 24–26 for the large pin arm 60 are equally applicable to small pin arm adaptor 50 and its corresponding reference numbers.

Elongated internal circular cavity 52, 62 extends most of the length of the body of pin adaptor 50, 60. To assemble, pin arm 70 is placed into cavity 52, 62. Initially, resilient arm 55, 65 extends outward as in FIGS. 23 or 24. The pin arm and pin adaptor assembly is then pressed into hole 12 until tip 56, 66 fully enters hole 16. For clarity, FIG. 25 does not show the pin arm, although small or large pin adaptor 50 or 60 is not normally installed without the pin arm already inside it. Arm 55, 65 has deflected inward as in FIGS. 25 and 26. Barb 57, 67 deflects around rib 17 until barb 57, 67 snaps into place behind rib 17. Arm 55, 65 is flexible throughout to allow the installation and removal process. Further, adequate clearances are present about arm 55, 65 to ensure that the required deflections are possible.

As arm 55, 65 deflects inward in hole 12, extension 51, 61 engages wall 71 of the pin arm groove, as best seen in FIG. 26. Pin arm 70 is held firmly because pulling out on pin arm 70 against extension 61 causes barb 67 to engage rib 17 even more firmly, since an increased outward bias is created behind barb 67.

Pin arm 70 is free to pivot within pin adaptor 60. To remove the assembly, the distal end of arm 65 is pushed toward the adaptor body, downward in FIG. 26, using a fingernail or sharp instrument. Barb 67 then clears rib 17 to an extent that pulling on the pin arm causes the assembly to come out of bracket 10. Arm 65 then deflects outward so that pin adaptor 60 can be removed from pin arm 70.

Slot 58, 68 provides a manufacturable cavity for extension 51, 61 to enter. Bump 53, 63 provides support for extension 61 against pulling forces upon pin arm 70. Bump 53, 63 supplements the tensile strength of arm 55, 65.

In a preferred embodiment, the exterior of the body of pin adaptor 50, 60 is of oval cross section, as seen in FIGS. 21 and 22. This allows thicker side walls for strength and plastic mold flow, while maintaining a minimum external height. Keyhole shape hole 12 is shaped likewise. It is desirable for hole 12 to have this flattened shape to reduce the maximum height of bracket 10. It is one of the objects of the present invention that bracket 10 be of minimal size. Necessarily, adaptor 50 and head 42 are also oval, although this shape has no specific advantage for these smaller parts.

The top surface 11 of bracket 10 is preferably tapered to a thin section at each end to visually minimize bracket 10 and give an aesthetically pleasing shape.

The components of the present invention are preferably manufactured from engineering thermoplastic, such as nylon or acetal. Acetal is especially suited for adaptors since they require sturdy but resilient elements. For bracket 10, a stiff glass filled nylon may be preferred.

The universal wiper arm attachment system of the present invention thus fits the currently common formats in the United States, including the large pin arm, in a simple to use, compact design. The components are simple to manufacture by injection molding. Furthermore, the present invention is well suited for low profile wiper designs.

What is claimed is:

1. A windshield wiper attaching system for coupling a wiper arm with a squeegee element comprising:
   a spring steel flat strip wiper frame with a length, thickness, width, and top and bottom surfaces;
   a first cavity through the thickness of the frame, near the center of the length of the frame;
   a further cavity through the thickness of the frame, spaced away from the first cavity;
   a bracket atop the frame, including a hook member extending downward through the first cavity and further extending to a distal end along the bottom surface of the frame, in a contacting relationship with the bottom surface of the frame;
   a further downward extending member of the bracket contacting at least one edge of the further cavity through the frame;
   the hook member holding the bracket in contact with the top surface of the frame;
   the further extending member holding the bracket from sliding along a surface of the frame by pressing the at least one edge of the further cavity through the frame.

2. The windshield wiper attaching system of claim 1 wherein:
   an intermediate assembly position of said bracket atop said frame comprises said hook member pressing said bottom surface, and said further extending member pressing said top surface, causing the frame to resiliently deflect to a first shape the further extending member spaced away from said further cavity such that the bracket is free to slide along the top surface;

sliding the bracket along the top surface of the frame to a final assay position allows the frame to deflect to a second shape where the further extending member has instantly fallen into the further cavity.

3. The windshield wiper attaching system of claim 1, wherein the system includes two of said first cavities, and four of said further cavities with the further cavities being a pair of notches formed into each outside edge across the width of the frame at the center of the length of the frame, four of said downward extending members engaged within each of the four notches, and two of said hook members extending through each of said first cavities.

4. The windshield wiper attaching system of claim 3, wherein a bottom surface of said bracket is flat and the top surface of said frame is convex such that the frame will press downward upon said hook members, and upward at said notches.

5. The windshield wiper attaching system of claim 1, wherein the bracket has a length and a width corresponding to said length and width of said frame, and a height in the direction of said thickness of said frame, the height being a maximum at the center of the length of the bracket, the height being substantially less at both ends of the length of the bracket than the maximum height at the center.

6. A windshield wiper adaptor system comprising:

a wiper frame with a length, width and a top and a bottom;

a bracket element attached to the frame including a cavity near a center of the length of the frame, the cavity extending inward from an external surface of the bracket element in a first direction across the width of the frame;

a rib within the cavity including a sharply defined surface of the rib which faces in said first direction;

a separate pin of the adaptor system with a resilient arm cantilevered from a body of the pin, the arm substantially parallel to a length of the body of the pin at least near a distal end of the arm;

a barb attached near the distal end of the arm, the barb extending away from the body of the pin;

the distal end of the arm spaced away from the body, being able to deflect toward the body;

the pin installed within the cavity of the bracket element so that the distal end of the arm adjacent the barb is deflected by pressing the rib, and a surface of the barb presses the sharply defined surface of the rib;

the pin thus confined in the first direction within the cavity by the barb pressing the rib.

7. The windshield wiper adaptor system of claim 6, wherein:

said bracket element includes an elongated recess formed in a top surface of the bracket element;

said cavity extends through the recess and said length of said pin body spans a width of the recess;

an adaptor element fits within the recess and includes a hole through which the pin passes, the adaptor element being free to pivot about the pin within the recess.

8. The windshield wiper adaptor system of claim 7, wherein the adaptor element includes:

an external shape including oppositely facing surfaces joined by a rounded end to slidably fit within a hook of a hook type wiper arm;

an internal rectangular channel extending through the adaptor to slidably fit a bayonet type wiper arm.

9. The windshield wiper adaptor system of claim 6, wherein said pin body comprises a substantially tubular form including an elongated hollow cylindrical interior, an opening in a side of the pin body exposing the interior to an exterior, a mediate location of said arm including a sharply defined inward extension facing the interior in a direction substantially opposite from said barb, when the arm is deflected toward the pin body the inward extension enters the opening in the side of the pin body, the extension engaging an annular groove of an elongated cylindrical pin arm element.

10. The windshield wiper adaptor system of claim 9, wherein a transverse cross section of the pin body includes an oval exterior shape, and said cavity includes an oval internal shape in a cross-section transverse to said first direction.

11. A windshield wiper adaptor element to receive at least a bayonet arm style element comprising:

a front, back, top, bottom, first and second sides;

an elongated rectangular internal channel extending in a substantially front to back direction;

an at least partially cylindrical opening extending from the first to the second side at which the adaptor element pivots upon a wiper frame assembly;

a recess in a top surface of the rectangular channel at a rear portion of the channel;

a resilient, cantilevered extension at a rearmost, bottom location of the rectangular channel, including a distal end substantially immediately below the recess in the top surface;

the cantilevered extension biasing a portion of the bayonet arm that includes a circular topside protrusion toward the top surface of the rectangular channel so that the circular protrusion is held within the recess in the top surface;

the bayonet arm thus restrained from sliding in a lengthwise direction within the rectangular channel;

wherein a cavity extends from an opening in said first side toward said second side in a direction the same as that of said at least partially cylindrical opening, the cavity exposed in said top surface of said rectangular channel to form said recess in the top surface.

* * * * *